United States Patent [19]

Mirza et al.

[11] Patent Number: 5,632,854
[45] Date of Patent: May 27, 1997

[54] PRESSURE SENSOR METHOD OF FABRICATION

[75] Inventors: Andy Mirza, Scottsdale; Ljubisa Ristic, Paradise Valley, both of Ariz.

[73] Assignee: Motorola, Inc., Schaumburg, Ill.

[21] Appl. No.: 517,047

[22] Filed: Aug. 21, 1995

[51] Int. Cl.$^6$ .................................................. H01L 21/00
[52] U.S. Cl. ...................... 438/53; 216/2; 216/33; 216/41; 216/56; 438/455; 438/978; 438/704
[58] Field of Search .................... 156/633.1, 643.1, 156/647.1, 651.1, 657.1, 659.11, 644.1; 437/228 SEN, 901; 29/25.35; 148/DIG. 12, DIG. 135; 257/417, 418, 419; 73/700, 708, 715, 720, 721, 726, 727; 216/2, 33, 41, 56

[56] References Cited

U.S. PATENT DOCUMENTS 4,975,390  12/1990  Fujii et al. ............... 437/228 SEN
5,095,349  3/1992   Fujii et al. .
5,295,395  3/1994   Hocker et al. .
5,316,618  5/1994   van Lintel .
5,318,652  6/1994   Hocker et al. .

Primary Examiner—William Powell
Attorney, Agent, or Firm—George C. Chen

[57] ABSTRACT

A pressure sensor (11) and its method of fabrication include etching a V-groove (19) in a first surface (16) of a first substrate (12), bonding a second substrate (24) to the first substrate (12), thinning the second substrate (24) to form a diaphragm (32) overlying the V-groove (19), and etching a port (38) from the second surface (18) of the first substrate (12) to the V-groove (19). Tetra-methyl-ammonium-hydroxide is preferably used to anisotropically etch the V-groove (19), and an anisotropic plasma reactive ion etch is preferably used to etch the port (38).

21 Claims, 2 Drawing Sheets

PRESSURE SENSOR METHOD OF FABRICATION

BACKGROUND OF THE INVENTION

This invention relates, in general, to forming a cavity in a substrate, and more particularly, to a pressure sensor and its method of fabrication.

Semiconductor devices such as piezoresistive pressure sensors, accelerometers, mass flow sensors, and the like can utilize a thin semiconductor layer, or sensor diaphragm, as a sensing or active element. A piezoresistor is formed in the sensor diaphragm, and the resistance of the piezoresistor varies with the deformation of the sensor diaphragm. With the continuing device integration efforts to produce smaller and more compact semiconductor components, the die size of piezoresistive pressure sensors and the like must also be reduced.

One prior art method of shrinking the die size is depicted in FIG. 1 where a recess 108 of approximately 1–2 microns deep is first etched into a frontside surface 102 of a substrate 109. A substrate 111 is subsequently bonded to substrate 109 covering recess 108. Substrate 111 is thinned to form a diaphragm portion 104 of pressure sensor 112. A backside surface 103 of substrate 109 is then anisotropically etched with potassium hydroxide (KOH) to form a port 101 which extends from backside surface 103 to recess 108.

However, this prior art method has certain drawbacks. In particular, the shallow depth of recess 108 produces reliability problems. The reliability of pressure sensor 112 can be degraded from particles, fluids, and moisture trapped within recess 108. Furthermore, the backside anisotropic etch is a time consuming process which requires frontside protection, especially when additional semiconductor devices are fabricated on the frontside of pressure sensor 112.

Accordingly, a need exists for a method of shrinking the die size of a pressure sensor. The method should not degrade the reliability of the pressure sensor, should be compatible with fabricating additional semiconductor devices on the same chip as the pressure sensor, and should be compatible with piezoresistive, capacitive, and other sensing technologies.

DETAILED DESCRIPTION OF THE DRAWINGS

Piezoresistive sensors measure a force by detecting strain induced in a diaphragm. Applied pressure on the diaphragm results in a strain change in the diaphragm which causes a change in the resistance in the piezoresistors. The magnitude of a resistance change is a measure of a strain inducing force such as an applied pressure. While the following description particularly describes a method of fabricating piezoresistive sensors, one skilled in the art will recognize that the method also applies to capacitive sensors, accelerometers, chemical sensors, valves, actuators, mass flow sensors, and other technologies where a cavity is required to be formed in a substrate.

Figure 2:
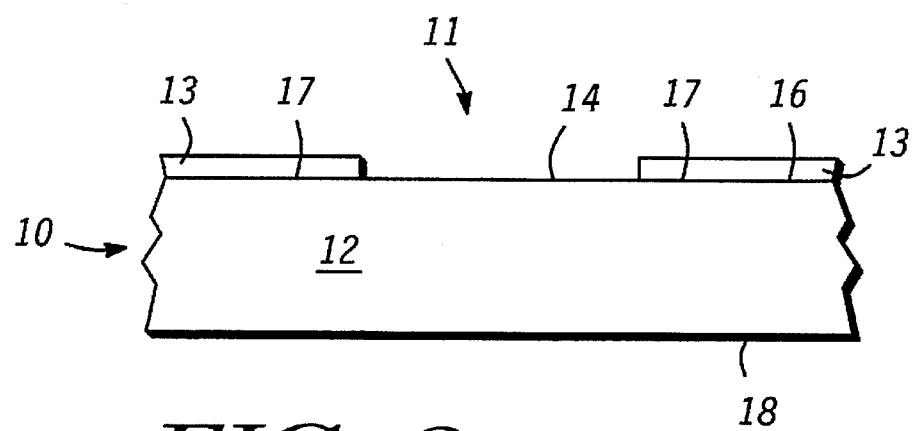
FIGS. 2–7 depict partial cross-sectional views of process steps for fabricating a pressure sensor in accordance with the present invention.

Turning to the figures for a more detailed description of the present invention, FIG. 2 depicts a partial cross-sectional view of a process step for fabricating a pressure sensor 11 in accordance with the present invention. Piezoresistive pressure sensor 11 is part of a semiconductor component 10 which comprises a substrate 12 which has two opposite surfaces or sides, namely surfaces or sides 16 and 18. Substrate 12 is referred to in the art as a handle wafer and can support a plurality of pressure sensors and semiconductor devices. Substrate 12 can comprise any semiconductor material but preferably comprises single crystalline silicon wherein surface 16 preferably has a <100> crystal plane orientation. Substrate 12 also preferably contains <111> crystal planes which form an angle of approximately 54.74° with respect to surface or side 16. To facilitate fabrication of pressure sensor 11, substrate or semiconductor substrate 12, which can be part of a four inch diameter wafer, preferably has a thickness less than a conventional 20 mils or 500 microns, preferably 15 mils or 375 microns.

A mask layer 13, which may comprise nitride but preferably comprises oxide, is disposed over a portion 17 of surface 16 while portion 14 of surface 16 remains uncovered or exposed. Mask layer or oxide layer 13 can be formed by growing a one micron thick silicon dioxide film over surface 16, patterning a photoresist layer over the oxide film such that a portion of the oxide film over portion 14 of surface 16 is exposed, etching the exposed portion of the oxide film with an etchant such as a buffered hydroflouric acid, thereby exposing portion 14 of surface 16, and removing the photoresist layer from the oxide film.

Figure 3:
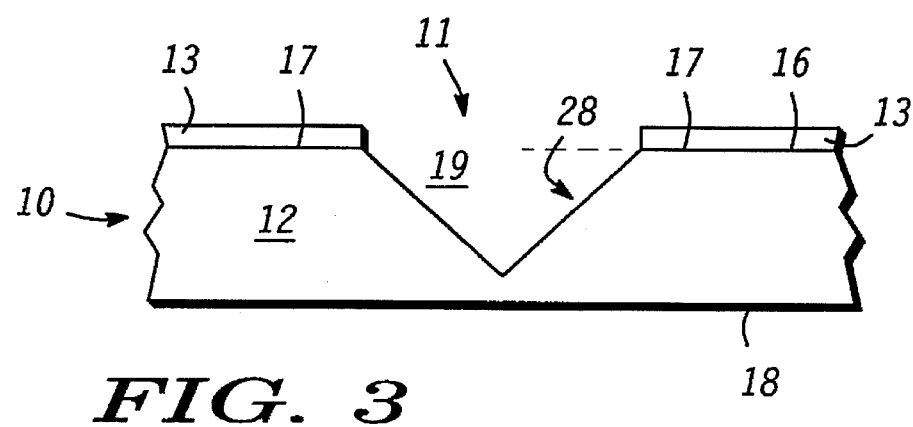

Continuing with FIG. 3, a V-groove 19 is formed in portion 14 of surface 16 of substrate 12. The use of an isotropic etchant is not preferred when forming V-groove 19 because dimensional control of V-groove 19 is important for pressure sensor 11. V-groove 19 controls the size or length of the sensor diaphragm. V-groove 19 is formed preferably by using an anisotropic etching process which uses mask layer 13 as an etch mask. While potassium hydroxide (KOH), sodium hydroxide (NaOH), lithium hydroxide (LiOH), cesium hydroxide (CsOH), hydrazine, ethylenediamine/pyrocatechol and other etchants can be used to form V-groove 19, a much cleaner and safer process is preferably used, such as a process which includes tetra-methyl-ammonium-hydroxide (TMAH) as described in U.S. Pat. No. 5,207,866, issued to Lue et al. on May 4, 1993 and which is hereby incorporated herein by reference.

As an organic base solution, TMAH preferentially etches single crystalline silicon having a <100> crystal plane orientation. Since TMAH will not etch <111> oriented single crystalline silicon, TMAH will stop etching substrate 12 at the <111> crystal planes. Therefore, the <111> crystal planes of substrate 12 will form sidewalls of V-groove 19. If surface 16 of substrate 12 has the preferred <100> orientation, the <111> crystal planes of substrate 12 will form a 54.74° angle with surface 16 as shown in FIG. 3 by angle 28. Consequently, if portion 14 of surface 16 were a square shape with an approximate area of 210,000 $\mu m^2$, the depth of V-groove 19 would be approximately 325 microns. Because TMAH will not etch the <111> crystal planes, the anisotropic etch for forming V-groove 19 does not have to be an endpointed or timed process.

Figure 4:
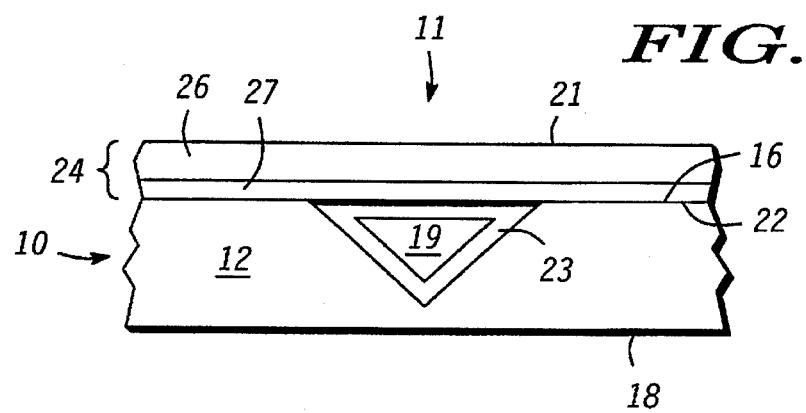

After formation of V-groove 19, mask layer 13 is removed, and substrate 24 is attached to substrate 12 as illustrated in FIG. 4. If comprised of oxide, mask layer 13 can be removed by using a hydrogen fluoride (HF) fume etch, a plasma oxide etch, a buffered oxide etch, or the like. Having surfaces 21 and 22, substrate 24 comprises similar semiconductor materials as substrate 12. In the preferred embodiment, substrate 24 is a substrate having an N-type substrate portion 26 and a P-type epitaxial portion 27. Surface 22 or P-type epitaxial portion 27 of substrate 24 is bonded to surface 16 of substrate 12 such that V-groove 19 is covered by substrate 24. A conventional direct wafer bonding process can be used for attaching substrates 12 and 24.

FIG. 4 also depicts an oxide layer 23 on the sidewalls of V-groove 19 and on a portion of surface 22 of substrate 24 which covers V-groove 19. While the direct wafer bonding process can be performed in a vacuum, the direct wafer bonding process is preferably performed in an oxygen ambient such that a thermal oxide or oxide layer 23 can be grown to a thickness of approximately 1000 Å during the high temperature direct wafer bonding process. However, an alternative process first disposes oxide layer 23 in V-groove 19 and then bonds substrates 12 and 24 together. For instance, if mask layer 13 were a silicon nitride layer, a local-oxidation-of-silicon (LOCOS) process could be used to grow oxide layer 23, or a low-temperature-oxide (LTO) process could be used. Oxide layer 23 is used as an etch stop during a subsequent process step described below.

After bonding substrates 12 and 24 together, substrate 24 is thinned by a chemical or mechanical process. For instance, a grind and polish process can be used on surface 21 to thin substrate 24 to a desired thickness. Alternatively, if substrate 24 were a silicon-on-insulator (SOI) substrate, substrate 24 could be etched, using the oxide layer of the SOI substrate as an etch stop. Additionally, if substrate 24 had an N-type substrate portion and a P-type epitaxial portion, the N-type substrate portion could be electrochemically etched, using the P-N junction of substrate 24 as an etch stop. Furthermore, a chemical-mechanical polish (CMP) process can also be used to thin substrate 24 to the desired thickness.

Figure 5:
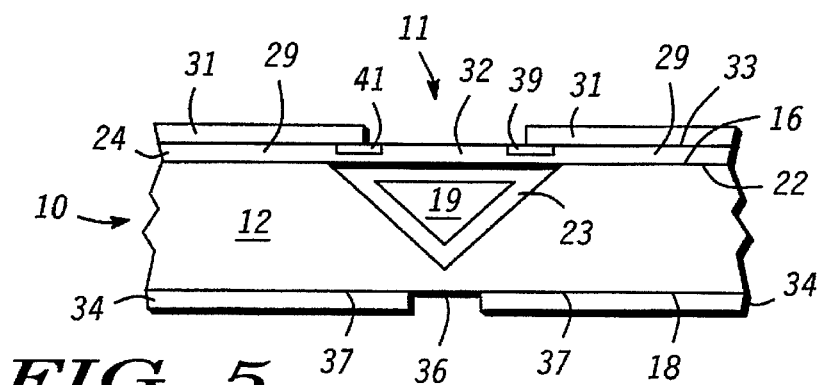

Substrate 24 is thinned to form a diaphragm 32 as depicted in FIG. 5. As mentioned previously, diaphragm 32 comprises piezoresistive material including, but not limited to, single crystalline silicon. Diaphragm 32 is less than 40 microns thick and preferably has a thickness of approximately 10 microns. The size of diaphragm 32 is determined by the size of V-groove 19. A wider V-groove 19 produces a larger area within which substrate 24 can be deflected or strained and, therefore, produces a larger diaphragm 32.

Upon completion of the thinning process, piezoresistors 39 and 41 are formed in surface 33 of diaphragm 32 of pressure sensor 11. Piezoresistors 39 and 41 can be N-type or P-type and can be formed using an ion implantation process to dope piezoresistors 39 and 41 and then using an anneal process to activate the implanted ions. Semiconductor devices 29 can be formed or fabricated in and on substrate 24 using conventional processes, and an interconnect structure 31 built or fabricated over semiconductor devices 29 can be used to electrically couple semiconductor devices 29 and piezoresistors 39 and 41. Semiconductor devices 29 can be coupled to form control circuitry, signal processing circuitry, a microcontroller, or the like. A passivation layer can be disposed on an upper portion of interconnect structure 31 to provide mechanical and chemical protection for the underlying interconnect and semiconductor devices. Interconnect structure 31 comprises of dielectric and metal layers. Semiconductor devices 29 can be used for interpreting the electrical signals from piezoresistors 41 and 39.

An oxide layer 34 is formed over portion 37 of surface 18 of substrate 12 while leaving portion 36 of surface 18 exposed. Portion 36 of surface 18 overlies at least a portion of V-groove 19. Oxide layer 34 is similar to mask layer 13 of FIG. 3.

Figure 6:
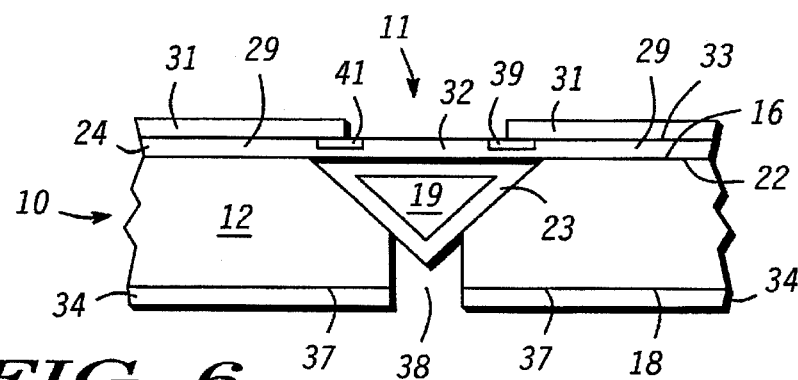

Turning now to FIG. 6, a port, cavity, or via 38 is then etched into substrate 12, preferably by an anisotropic plasma reactive ion etching process which uses oxide layer 34 as an etch mask and which uses oxide layer 23 within V-groove 19 as an etch stop. Port 38 is narrower than V-groove 19 and extends from surface 18 of substrate 12 to V-groove 19. A plasma reaction ion etch tool can be used for dry etching port 38. Current deep dry etch systems can achieve etch rates of about 5 microns per minute and an etch selectivity of 200:1 between silicon and silicon dioxide. As described previously, if substrate 12 were approximately 375 microns thick and if V-groove 19 were approximately 325 microns deep, the dry etch process would need to etch through approximately 50–100 microns of single crystalline silicon. At a 50 micron depth, port 38 would reach the tip of V-groove 19. However, port 38 would need to have a greater depth to expose or to connect to a larger portion of V-groove 19.

Figure 7:
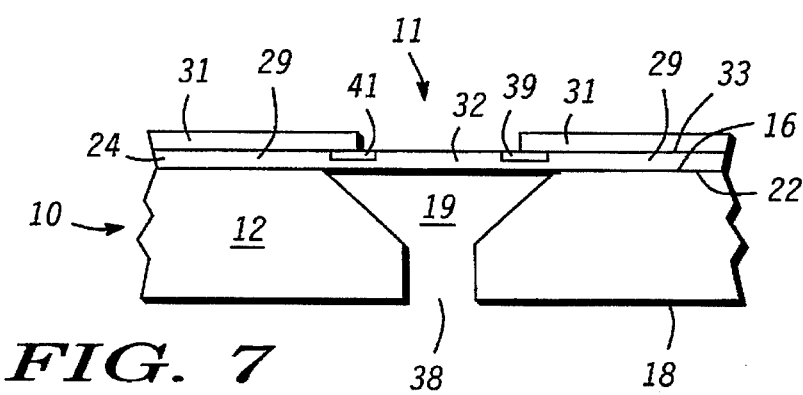

FIG. 7 illustrates that oxide layers 23 and 34 are removed using processes including, but not limited to, a hydrogen fluoride fume etch or a plasma oxide etch. As described and fabricated above, pressure sensor 11 is designed to measure a pressure of approximately 0.1 to several thousand kilopascals (kPa) but is preferably used to measure a pressure between 10 and 1000 kPa.

Many variations of the above described method exist in accordance with the present invention. An alternative embodiment of the subject invention could use a second TMAH etch or other wet etchant instead of the dry etch to form port 38. It is also understood that semiconductor component 10 can contain a plurality of pressure sensors, and that the process of etching V-groove 19 and port 38 can be applied to applications other than pressure sensors which similarly require a via extending through a substrate.

The presence of etch stop or oxide layer 23 within V-groove 19 permits the use of the dry etching process of FIG. 6 and makes the anisotropic formation of port 38 very repeatable. The use of the dry etch process eliminates the necessity for using a conventional KOH etch which can contaminate semiconductor devices 29 and, therefore, also eliminates the need for frontside protection of semiconductor devices 29 during the etching of port 38.

The dry etching of a trench greater than 100 microns often does not remain anisotropic throughout the entire etch process due to the depth of the trench and the limitations of the mass transport phenomenon. Consequently, it is not feasible to simultaneously and repeatedly maintain an accurate profile of port 38 and produce a precise diaphragm opening while dry etching through the entire 375 micron thickness of substrate 12. However, the formation of V-groove 19 in surface 16 of substrate 12 makes the dry etching process of FIG. 6 manufacturable for pressure sensor 11 because the opening for diaphragm 32 is accurately and precisely formed by the frontside V-groove etch and not by the backside dry etch. Consequently, the limited lateral etching tolerance control for very deep dry etches is no longer an issue of concern for the dry etch process of FIG. 6 provided that port 38 is not as wide as V-groove 19. Furthermore, since the V-groove extends through a portion of the thickness of substrate 12, the dry etch process of FIG. 6 does not need to etch greater than 100 microns deep.

The use of a thinner substrate 12 of approximately 375 microns instead of the conventional 500 microns also permits the use of a dry etch process for formation of port 38. If a smaller diaphragm 32 were required, V-groove 19 would be smaller and more shallow, and port 38 would have to be deeper. If port 38 were too deep to maintain anisotropic control, substrate 12 could be thinner to reduce the depth of port 38. However, if substrate 12 were too thin, fabrication yields of semiconductor component 10 would decrease due to the fragility of substrate 12.

Figure 1:
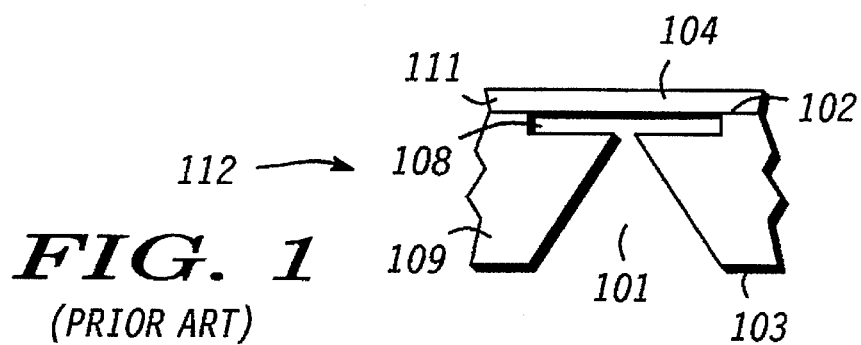
FIG. 1 illustrates a cross-sectional view of a prior art pressure sensor.

Because V-groove 19 is not a shallow recess as in the prior art, particles, fluids, and moisture will not be trapped within V-groove 19 which eliminates the reliability issues of the prior art sensor in FIG. 1. Furthermore, while not an absolute requirement of the present invention, the elimination of KOH as an etchant makes the subject invention more compatible with conventional semiconductor transistor fabrication.

As the diameter of the silicon wafers increase, the thickness of the silicon wafers must also increase to maintain sufficient wafer strength. If a single backside wet anisotropic etch were used to etch a cavity opening for a sensor diaphragm, the die size for a sensor would increase with an increasing wafer diameter. However, with the use of anisotropic dry etching, the described process of the present invention is scaleable from four inch diameter silicon wafers to six inch and larger diameter silicon wafers without increasing the die size of the sensor component.

During operation of semiconductor component 10, semiconductor devices 29 and the front side of semiconductor component 10 are isolated from the backside pressure. As a result, semiconductor component 10 is compatible with the gaseous or liquid media which pressure sensor 11 is sensing or monitoring. Since aluminum wire bonds (not shown) coupling semiconductor component 10 to a package (not shown) would be on the frontside of semiconductor component 10, the aluminum wire bonds would not be exposed to the media whose pressure is being measured and, therefore, would not be corroded by the media.

Therefore, in accordance with the present invention, it is apparent there has been provided an improved method of fabricating a pressure sensor which overcomes the disadvantages of the prior art. The present invention reduces the size of conventional sensors, is repeatedly manufacturable, enables the use of dry etching for port formation, is a cleaner process since it does not require KOH etching, does not require additional process steps for frontside protection since it does not require KOH etching, improves the reliability of miniaturized pressure sensors, is compatible with fabricating other semiconductor devices on the same chip, and is compatible with different types of sensors including, but not limited to, capacitive pressure sensors and piezoresistive pressure sensors.

We claim:

1. A method of fabricating a pressure sensor, the method comprising the steps of:
   providing a first substrate having two opposite surfaces, namely a first surface and a second surface;
   forming a V-groove in the first surface of the first substrate wherein the V-groove is absent along the second surface of the first substrate;
   attaching a second substrate to cover at least a portion of the first surface of the first substrate; and
   forming a port into the second surface of the first substrate and towards the first surface of the first substrate, the port connected to the V-groove in the first surface of the first substrate.

2. The method according to claim 1, wherein forming the V-groove further comprises:
   disposing an oxide layer over the first surface of the first substrate;
   etching an opening in the oxide layer to expose the portion of the first surface of the first substrate; and
   etching the V-groove in the portion of the first surface of the first substrate.

3. The method according to claim 2, further including removing the oxide layer.

4. The method according to claim 2, wherein disposing the oxide layer further includes using a local-oxidation-of-silicon process.

5. The method according to claim 1, further comprising using tetra-methyl-ammonium-hydroxide for forming the V-groove.

6. The method according to claim 1, further comprising:
   providing a semiconductor substrate having a <100> crystal plane orientation and having <111> crystal planes for the first substrate; and
   forming the V-groove at the <111> crystal planes of the first substrate.

7. A method of fabricating a pressure sensor, the method comprising the steps of:
   providing a first substrate having two opposite surfaces, namely a first surface and a second surface;
   forming a V-groove in a portion of the first surface of the first substrate;
   attaching a second substrate to cover at least a portion of the first surface of the first substrate;
   forming a port extending from the second surface of the first substrate to the V-groove of the first surface of the first substrate; and
   disposing an oxide layer in the V-groove.

8. The method according to claim 7, wherein forming the port further comprises etching a portion of the second surface of the first substrate, wherein etching the portion of the second substrate terminates at the oxide layer in the V-groove, and wherein the port is narrower than the V-groove.

9. The method according to claim 8, further including removing the oxide layer in the V-groove.

10. The method according to claim 1, wherein forming the port further comprises using a dry etch to anisotropically etch the port from the second surface of the first substrate to the V-groove of the first surface of the first substrate.

11. The method according to claim 1, further including:
    providing a substrate having a thickness less than 500 microns for the first substrate; and
    thinning the second substrate.

12. The method according to claim 1, further comprising forming semiconductor devices in the second substrate, the semiconductor devices coupled to the pressure sensor.

13. A method of fabricating a semiconductor component, the method comprising the steps of:
    providing a first substrate with a first surface and a second surface, the first surface opposite the second surface;
    anisotropically etching a groove in a portion of the first surface of the first substrate;
    bonding, in an ambient comprising oxygen, a second substrate to at least a portion of the first surface of the first substrate;
    fabricating semiconductor devices in the second substrate; and
    etching a port into the second surface of the first substrate, the port extending from the second surface to the groove.

14. A method of fabricating a semiconductor component, the method comprising the steps of:

providing a first substrate with a first surface and a second surface, the first surface opposite the second surface;

etching a V-groove in a portion of the first surface of the first substrate:

bonding a second substrate to at least a portion of the first surface of the first substrate;

fabricating semiconductor devices in the second substrate;

etching a port into the second surface of the first substrate, the port extending from the second surface to the V-groove;

forming an oxide layer in the V-groove;

stopping the etching of the port at the oxide layer of the V-groove, wherein the etching of the port is anisotropic, and wherein the V-groove is wider than the port; and removing the oxide layer.

15. The method according to claim 13, further including:

providing a substrate having a thickness less than 500 microns for the first substrate; and thinning the second substrate.

16. The method according to claim 13, further comprising providing single crystalline silicon having a <100> crystal plane orientation and having <111> crystal planes for the first substrate and wherein etching the groove stops at the <111> crystal planes.

17. The method according to claim 13, further including using tetra-methyl-ammonium-hydroxide for etching the groove.

18. A method of fabricating a semiconductor component, the method comprising the steps of:

providing a first semiconductor substrate having <111> crystal planes, a first surface, and a second surface opposite the first surface, the first surface having a <100> crystal plane orientation;

masking a first portion of the first surface of the first semiconductor substrate;

etching a second portion of the first surface of the first semiconductor substrate to form a V-groove in the second portion of the first surface, the etching stopping at the <111> crystal planes of the first semiconductor substrate;

providing a second semiconductor substrate having a first side and a second side opposite the first side;

disposing an oxide layer in the V-groove of the first surface of the first semiconductor substrate;

attaching the first side of the second semiconductor substrate to the first semiconductor substrate;

thinning the second semiconductor substrate from the second side;

fabricating semiconductor devices in the second semiconductor substrate;

masking a first portion of the second surface of the first semiconductor substrate while exposing a second portion of the second surface of the first semiconductor substrate, the second portion of the second surface located over at least a portion of the oxide layer in the V-groove;

etching the second portion of the second surface of the first semiconductor substrate, the etching stopping at the oxide layer in the V-groove; and removing the oxide layer in the V-groove.

19. The method according to claim 18, wherein masking the first portion of the first surface of the first semiconductor substrate further comprises using an oxide layer as a mask layer.

20. The method according to claim 18, further comprising providing single crystalline silicon for the first and second semiconductor substrates and wherein etching a second portion of the first surface of the first semiconductor substrate further comprises using tetra-methyl-ammonium-hydroxide.

21. The method according to claim 18, wherein etching the second portion of the second surface of the first semiconductor substrate further includes using an anisotropic plasma reactive ion etch.

\* \* \* \* \*